United States Patent [19]

Kanamori et al.

[11] Patent Number: 5,428,465
[45] Date of Patent: Jun. 27, 1995

[54] METHOD AND APPARATUS FOR COLOR CONVERSION

[75] Inventors: Katsuhiro Kanamori; Osamu Yamada; Hideto Motomura, all of Kawasaki; Toshiharu Kurosawa, Yokohama; Teruo Fumoto, Kawasaki, all of Japan

[73] Assignee: Matsushita Electric Industrial Co., Ltd., Osaka, Japan

[21] Appl. No.: 928,373

[22] Filed: Aug. 12, 1992

[30] Foreign Application Priority Data

Aug. 12, 1991 [JP] Japan .................................. 3-201675
Oct. 24, 1991 [JP] Japan .................................. 3-277428

[51] Int. Cl.$^6$ .......................... G03F 3/08; H04N 1/46
[52] U.S. Cl. .................................. 358/518; 358/523; 358/525; 395/131
[58] Field of Search ................. 358/30, 11, 501, 504, 358/515, 517, 518, 520, 521, 523, 524, 525; 395/131

[56] References Cited

U.S. PATENT DOCUMENTS

| | | |
|---|---|---|
| 4,275,413 | 6/1981 | Sakamoto et al. |
| 4,831,434 | 5/1989 | Fuchsberger |
| 4,959,711 | 9/1990 | Hung et al. .................... 358/523 |
| 5,087,965 | 2/1992 | Torre-Bueno ................. 358/523 |
| 5,241,373 | 8/1993 | Kanamori et al. ............ 358/518 |

FOREIGN PATENT DOCUMENTS

58-16180  7/1983  Japan .

Primary Examiner—Edward L. Coles, Sr.
Assistant Examiner—Thomas D. Lee
Attorney, Agent, or Firm—Lowe, Price, LeBlanc & Becker

[57] ABSTRACT

The present invention relates to a method and apparatus applied to a widely-used and high-speed color conversion which is utilized in a color printer, a color display apparatus and the like, and provides a novel three-dimensional interpolation operation by use of a triangle-pole shaped interpolation unit-space. Input color signals R,G, and B are converted into lightness signal Y and chromaticity signals Cr, Cb which constitute a three-dimensional space. This three-dimensional space is dissected into rectangular parallelopipeds and is further divided into two prisms having base planes parallel to the chromaticity plane CrCb. A prism judging section 207 judges which of prisms an input color is involved in. There are provided a plurality of color conversion table memories 210~215 which store output values corresponding to input values constituting respective points of the prism and difference values of mutual output colors and further difference values of mutual difference values. Stored data in respective color conversion table memories 210~215 are weighted by lower-bit signals 205, 206 of the input color signals in multipliers 219, 220, 226, 227, and 230. Then, these data are added in adders 220, 221, 228, 229, and 231 so as to accomplish a linear interpolation using output values of six vertices which constitute the prism.

11 Claims, 9 Drawing Sheets

METHOD AND APPARATUS FOR COLOR CONVERSION

BACKGROUND OF THE INVENTION

1. Field of the Invention

The present invention relates to a color conversion in which color image signals or color video signals are inputted and transformed into desirable colors, for example, utilized for a color hard copy apparatus, a color display apparatus, a color TV camera apparatus, a color recognition apparatus, a video editing apparatus and the like.

2. Description of the Prior Art

Conventionally, in an image processing for monochrome images, one picture plane of an image has only one-dimensional information; i.e. lightness. Therefore, in order to perform a lightness conversion as a gamma curve conversion, a real-time color conversion can be realized by memorizing various non-linear curves into Look-Up Tables (LUT).

Furthermore, even in the case where color images are dealt with in such an image processing, in order to realize a real-time color conversion, three pieces of monochrome image plane consisting of a Red plane, a Green plane, and a Blue plane were utilized. And, a conversion processing of each monochrome color plane was independently executed by means of an exclusively provided LUT.

However, the color conversion actually handled in such a conventional processing is essentially the same as one-dimensional processing. That is, the color conversion in accordance with this type of image processing is normally expressed as follows:

$$R'=hR(R), G'=hG(G), B'=hB(B)$$

In a color image processing, since information included in one picture plane is a three-dimensional information of (R, G, B), it will be understood from the view point of a substantial meaning of the color image processing that the color conversion should be defined as follows:

$$R'=fR(R,G,B), G'=fG(R,G,B), B'=fB(R,G,B)$$

For example, in a color image processing operation, it is required to accurately reproduce colors by transferring images on one color display device to other color display device or to accurately reproduce manuscripts of color photographs or color printed matters on a color hard copy. Furthermore, there is a complicated requirement for color adjustment or color conversion such that only specific color is required to be adjusted for accomplishing a color design. Such a processing is involved in the processing using above-described function comprising three variables.

For example, as one of techniques becoming important in a recent color image processing art, there is known an HLS-transformation in which a color expressed in a form of (R,G,B) is transformed into a hue H, a lightness L, and a saturation S.

According to this technique, one input is defined as a function of three inputs such as $H=H(R, G, B)$. Therefore, it can be concluded that this type of color conversion belongs to above-described three-dimensional conversion.

In the case where such a color conversion is carried out by use of a conventional memory table, however, if one color is defined as an 8-bit signal, a large memory capacity up to 16M byte would be required for realizing only one color conversion. Accordingly, an appropriate hardware capable of being widely used and realizing a real-time processing was required in the conventional art for executing certain color conversion in compliance with such a three-dimensional color conversion.

However, in the case where such a processing is executed by using hardware in order to realize a real-time processing, it was difficult to make a numerical formula model since various color devices are associated. Otherwise, even if the numerical formula model could be produced, a hardware used for realizing this numerical formula becomes complicated and special.

For such reasons, there have been used a three-dimensional color look-up table capable of renewing data, which has inputs of dispersed lattice points disposed in a three-dimensional space defined by three variables such as RGB, and a three-dimensional interpolation means for compensating an input between dispersed lattice points.

For example, there has been known a color signal interpolation method (For example, refer to Japanese Patent No. SHO 58-16180) which mainly executes a color correction for a color hard copy and a color scanner by dissecting an input color space into a plurality of color spaces, selecting a plurality of color correction information of their vertices, and carrying out a weighting processing to output an interpolated result.

This prior art discloses an idea for simplifying the interpolation calculation in such a manner that, in the interpolation processing, a unit cube is set in the three-dimensional color signal space, and this unit cube is dissected into a plurality of tetrahedrons, and further the interpolation calculation is executed on the basis of output signals obtained from respective vertices of the tetrahedrons.

By utilizing this method as a color conversion apparatus capable of being widely used, a non-linear flexible color conversion such as a color change of a specific color in the color space can be carried out at a high speed while a gradation of image is maintained without being changed.

However, in the case where the input color space includes regular three-dimensional lattice points forming unit interpolation sections, the input color space in accordance with the conventional art was dependent on properties of device such as a three-principal-color reflectance, a transmittance, or a three-principal-color density derived from each color scanner. And, its three-dimensional coordinate axes are respectively divided by being uniformly calibrated.

This shows that the conventional technique has a problem in that it does not utilizes an important human property; i.e. the human visual characteristics on one hand requires a fine gradation in a lightness direction but on the other hand does not require so fine gradation in a chromaticity direction.

Furthermore, since the conventional technique sets a tetrahedron as a unit interpolation section which is formed by dissecting a unit cube in the input color space into a plurality of tetrahedrons, in the case where the input color changes along a line parallel to the lightness direction, the input color passes a plurality of different tetrahedrons and is interpolated linearly in each tetrahedron independent of one another.

For this reason, when the color conversion is a nonlinear conversion, there was a problem such that a certain input having a gradation in a direction of gray color, which is most important in the human visual characteristics, cannot have a linear and smooth interpolation output value, and rather has an unnatural interpolated output value such as an unnaturally broken line.

Still further, in case of the conventional technique, when required to change output values at lattice points of the color space for color adjustment and so on, there was a problem such that a space utilized for color conversion and a space utilized for interpolation do not coincide with each other.

This is because the color space including lattice points used for interpolation is chiefly an RGB space or a density space, on the other hand, the space convenient for color conversion is often a separation space of lightness and chromaticity suitable for human color vision or a polar coordinates of chromaticity, saturation, and lightness defined in a lightness-chromaticity space. That is, the lattice points serving as color control points are not regularly arrayed in the color space executing color conversion. In some cases, even if a specific color region is designated, a corresponding lattice point may not actually exist.

SUMMARY OF THE INVENTION

In order to accomplish above purpose, the present invention provides a method and apparatus for transforming color signals which can transform an input color signal consisting of three principal color separation colors into a lightness and a chromaticity signals and, in turn, executes an interpolation operation in a space defined by these lightness and chromaticity components. Further, the interpolation method of the present invention dissects a three-dimensional space into prisms as unit interpolation sections so as to execute a linear interpolation in respective inside spaces.

An operation of the color conversion method and its apparatus in accordance with the present invention will be discussed below. Color spaces such as R, G, and B, which are formed by output signals from the color scanner and the like as described above, are called as "device depend colors" which are dependent on an individual color apparatus. But, these expression are not general as an expression of colors. Furthermore, it is hard to say that respective axes adequately reflect the human visual characteristics.

It is therefore a recent development that there is a movement to unify the color expression among various color apparatus (color display devices, various color hard copies). This is called as "device independent colors". It is predicted in view of various color spaces that separated spaces like CIE-Lab or YIQ defined by lightness and chromaticity components will be prospective for future use. Furthermore, from the view point of executing a color adjustment of images, separating an input color signal into lightness and chromaticity components is advantageous in changing its color only while maintaining its gradation without being changed.

In view of these reasons, a combination of a lightness and two kinds of chromaticities such as (Y, I, Q, or Y, R-Y, B-Y) will be most appropriate for an input space of a widely-used color conversion apparatus of an interpolation type.

Therefore, as a primary measure for solving above-described problem, even if the input color signal is a three-principal-color signal consisting of a red, a green, and a blue, the input color signal is transformed into a lightness-chromaticity separation type signal before the interpolation is carried out. And, an interpolation section is set thereafter.

In this case, in order to attach importance to lightness gradation, it is possible to set a unit interpolation section to be fine in a lightness direction. Furthermore, in order to increase an interpolation accuracy in case of receipt of an input having a gradation in a gray-color direction, it is important to set the unit interpolation section so as not to cause an unnatural broken line as a linear interpolation line. In view of this point, the present invention solves this subject by setting a triangle-pole shaped space as a unit interpolation section so as to have a base plane parallel to the chromaticity plane in the input color space and executing a linear interpolation in its inside space.

Moreover, the present invention has a purpose, in view of above conventional technical problems and disadvantages, to provide a man machine interface capable of improving an interpolation accuracy in a lightness direction which is important in human visual characteristics, and capable of coinciding a color conversion or color adjustment space with an interpolation space in order to respond to a requirement for color adjustment carried out by separating lightness and chromaticity or for color conversion between different medias. Furthermore, the present invention has another purpose to provide a color conversion apparatus capable of simplifying the apparatus in overall constitution by providing simplified lightness signal generating apparatus and chromaticity signal generating apparatus.

In order to accomplish above purpose, the present invention provides a color conversion apparatus which includes a three-dimensional interpolation section for executing an interpolation operation, said three-dimensional interpolation section comprising:

a prism judging section which, when any output color signal is generated from an input color signal, dissects a three-dimensional space being formed by the input color signal into a plurality of rectangular parallelepipeds, divides the rectangular parallelepiped into two prisms, and judges which of the prisms the input color signal is involved in;

color conversion table memories storing output values corresponding to respective vertices of the prism region;

address conversion means for executing a transformation to one-dimensional address signal on the basis of an upper-bit signal of said input color signal and a judgement signal from the prism judging section; and multipliers and adders;

whereby generating the output color signal by converting the input color signal in such a manner that the interpolation operation can be executed in each prism by use of output values from said color conversion table memories and a lower-bit signal.

Furthermore, the color conversion apparatus in accordance with the present invention further comprises, in addition to above-described constitution, a lightness signal generating means which expresses coefficients utilized for generating a lightness signal from three primary color signals of red, green, and blue in a form of a summation of several powers of 2, and generates the lightness signal by a bit shift and an adding means.

Moreover, in order to generate chromaticity signals from three principal signals of red, green, and blue, there are provided a subtracting means for generating a difference signal between the red signal and a lightness signal, and a difference signal between the blue signal and the lightness signal, and a chromaticity signal generating means for giving a flexibility in setting a range of chromaticity expression and in its expressed form by use of a level shift means and a look-up table means.

The conventional three-dimensional color signal interpolation method which uses dissected tetrahedrons did not give specific meanings to respective coordinate axes defining the three-dimensional, which resulted in non-efficiency in utilizing memories. However, in accordance with the present invention, respective coordinate axes defining the three-dimensional are characterized by utilizing a prism. That is, a main axis direction of the prism can be characterized for representing lightness and a triangle base plane can be characterized for representing chromaticity. Accordingly, it becomes possible to separate a memory into two for lightness and chromaticity so as to effectively utilize it.

Furthermore, the present invention is advantageous in that color conversion table memories can be effectively utilized by use of an address conversion means.

Moreover, since an interpolation is carried out in a separation space of lightness and chromaticity, it is convenient for an application to a field of color adjustment. Especially, it brings a greater effect in a color image processing field.

Still further, a lightness signal generating apparatus and a chromaticity signal generating apparatus adopted in the present invention not only effect their merits by virtue of their simplified structures when associated to function as a part of the color conversion apparatus in accordance with the present invention but provides a novel unit simpler than a conventional matrix calculator when used as an independent lightness signal generating unit or a chromaticity signal generating unit. Especially, an adoption of look-up tables can enlarge the degree of freedom in generating chromaticity signal.

The above and other objects, features and advantages of the present invention will become more apparent from the following detailed description which is to be read in conjunction with the accompanying drawings.

BRIEF DESCRIPTION OF THE DRAWINGS

FIG. 12 (a) is a view showing stored data in a look-up table for Cr shown in FIG. 11, and FIG. 12 (b) is a view showing stored data in a look-up table for Cb shown in FIG. 11.

DETAIL DESCRIPTION OF THE PREFERRED EMBODIMENTS

Hereinafter, referring now to the accompanying drawings, embodiments of the present invention are explained in detail.

1. Color Conversion Method

Hereinafter, one embodiment of a color conversion method in accordance with the present invention is explained.

In this embodiment, before executing an interpolation, a color signal expressed by (R, G, B) color space is transformed into a color space expressed by lightness and chromaticities. Though a definition of lightness and chromaticities can be determined in any form, this embodiment adopts Y, Cr=(R-Y), and Cb=(B-Y). This is because a conversion equation becomes simple. But, it is needless to say that other definitions such as YIQ color space can be adopted. A conversion equation for converting RGB into YCrCb is defined as follows.

[Numerical Formula 1]

$$Y = 0.299\,R + 0.587\,G + 0.114\,B \qquad \text{Equation (1)}$$

$$Cr = R - Y$$

$$Cb = B - Y$$

Figure 3:
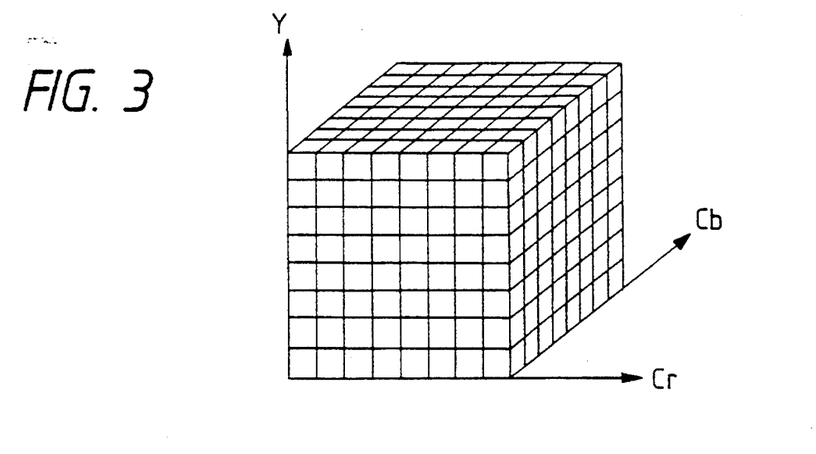
FIG. 3 is a conceptual view showing a three-dimensional space defined by Y, Cr, Cb being dissected into a plurality of rectangular parallelepipeds in the color conversion apparatus in accordance with one embodiment of the present invention.

Next, a three-dimensional color space expressed by Y, Cr, and Cb is dissected as shown in FIG. 3 by dividing respective axes to roughly form a plurality of unit rectangular parallelopiped regions. From the view point of human visual characteristics, it is advantageous to finely divide an Y-axis representing lightness and to the contrary to roughly divide Cr and Cb axes representing chromaticity, which also results in effectively using a limited memory capacity. However, respective axes in FIG. 3 are uniformly divided for simplifying an explanation.

Figure 4:
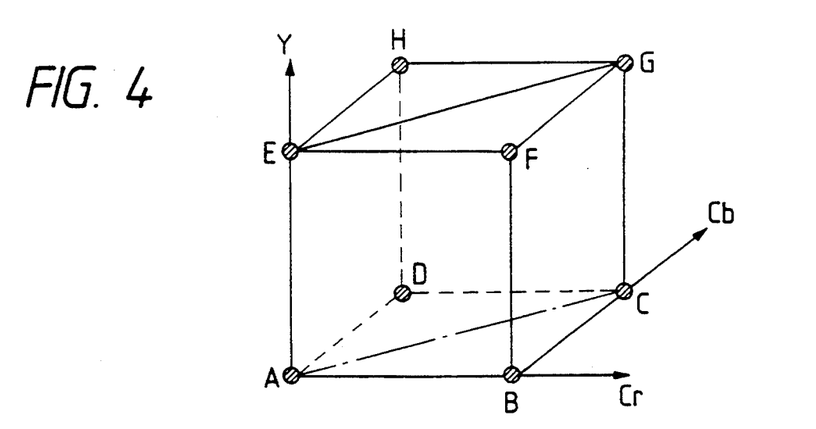
FIG. 4 is a view showing two prisms being formed by dividing the rectangular parallelepiped in the color conversion apparatus in accordance with one embodiment of the present invention.
Figure 5:
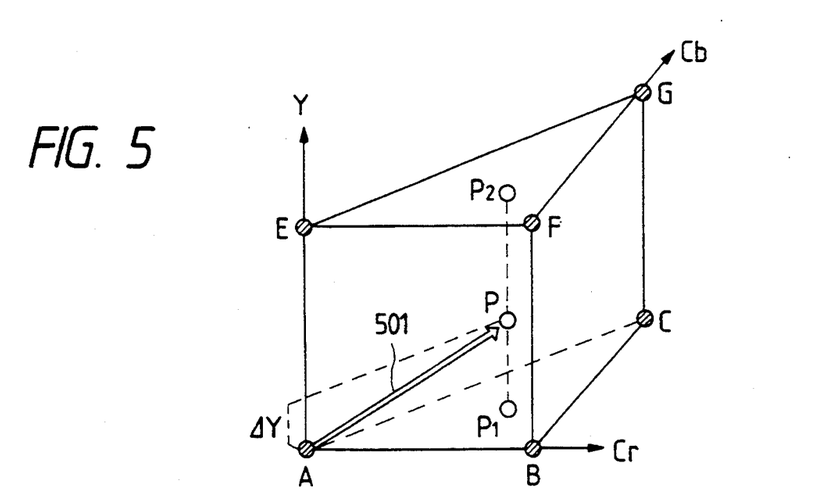
FIG. 5 is a view showing one prism ABC-EFG in the color conversion apparatus in accordance with one embodiment of the present invention.

Though each unit rectangular parallelopiped has a rectangular chromaticity plane defined by Cr and Cb, each unit rectangular parallelepiped is further divided into two prisms along a diagonal line of the rectangular chromaticity plane. FIG 4 shows a unit rectangular parallelopiped ABCD-EFGH and its divided two prisms. FIG. 5 shows one of these prisms; i.e. a prism ABC-EFG.

In the case where a color point is inputted in this prism, its corresponding output value can be interpolated based on output values of respective vertices of the prism.

Now, if the output values on respective vertices A, B, C, E, F, and G of the prism shown in FIG. 5 are expressed in a form of (A), (B), (C), (E), (F), and (G), respectively, an output value (P) corresponding to an input color point P can be interpolated through the following three steps by using $\Delta Y$, $\Delta Cr$, and $\Delta Cb$ which are Y-axis, Cr-axis, and Cb axis components of a vector AP extending from the vertex A to the input color point P, respectively.

In a first step, a line is drawn from the point P in parallel with Y-axis to obtain intersection points P1, P2 on a triangle ABC and a triangle EFG, respectively. Then, on the triangle ABC, the output value (P1) of the point P1 is interpolated as follows.

[Numerical Formula 2]     Equation (2)

$(P1) = (A) + \Delta Cr \cdot \{(B) - (A)\} +$ $\Delta Cb \cdot \{(C) - (B)\}$

Figure 6:
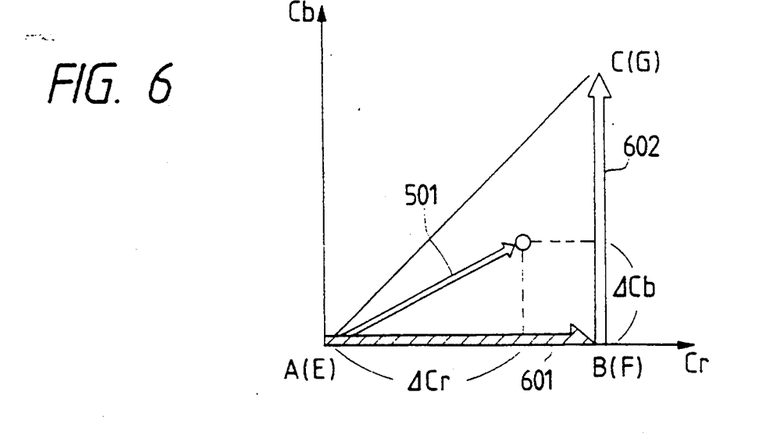
FIG. 6 is a view showing the prism ABC-EFG, which is seen from the direction of Y-axis.

This interpolation has the following meaning in the drawing. FIG. 6 is a view showing the prism shown in FIG. 5 from the direction of Y-axis. When seen from this direction, two base surfaces of the prism are perfectly superposed. That is, points P and P1 and P2, points A and E, points B and F, and points C and G are superposed at the same positions. Accordingly, it is possible to regard this triangle as a triangle ABC, now.

Therefore, In FIG. 5, the component $\Delta Cr$ and the component $\Delta Cb$ are obtained by projecting the vector AP on a first input difference vector AB (601) and on a second input difference vector BC (602), respectively. Then, a first output difference value $\{(B)-(A)\}$ and a second output difference value $\{(C)-(B)\}$, which correspond to respective input difference vectors, are weighted in an output space by use of $\Delta Cr$ and $\Delta Cb$ to obtain a first and a second output increased amounts. Further, these outputs are added to the output value (A) of the point A.

By the way, though the interpolation operation in accordance with the present embodiment chiefly uses difference values, it is apparent that the same result can be obtained even if the output values (A), (B), and (C) are added by being respectively weighted, although one more multiplication is further required.

In the second step, the triangle of FIG. 6 is regarded as the triangle EFG, and an output value (P2) of the point P2 is obtained by weighting a first output difference value $\{(F)-(E)\}$ and a second output difference value $\{(G)-(F)\}$ in the same manner as the above interpolation operation, as follows:

[Numerical Formula 3]     Equation (3)

-continued $(P2) = (E) + \Delta Cr \cdot \{(F) - (E)\} +$ $\Delta Cb \cdot \{(G) - (F)\}$ In the third step, the output values (P1) and (P2) are interpolated on a line segment P1-P2 of FIG. 5 as follows.

[Numerical Formula 4]

$(P) = (P1) + \Delta Y \cdot \{(P2) - (P1)\}$     Equation (4)

If the terms of previously obtained equations (2) and (3) are entered in the above equation (4), its result becomes as follows:

[Numerical Formula 5]     Equation (5)

$(P) = (A) + \Delta Cr \cdot \{(B) - (A)\} + \Delta Cb \cdot \{(C) - (B)\} +$ $\Delta Y \cdot [(E) - (A) + \Delta Cr \cdot \{(F) - (E) - (B) + (A)\} + \Delta Cb \cdot \{(G) - (F) - (C) + (B)\}]$ As explained above, in the case where the input point P is located in the prism ABC-EFG, the output value of the point P is determined in accordance with the above-described manner.

Figure 7:
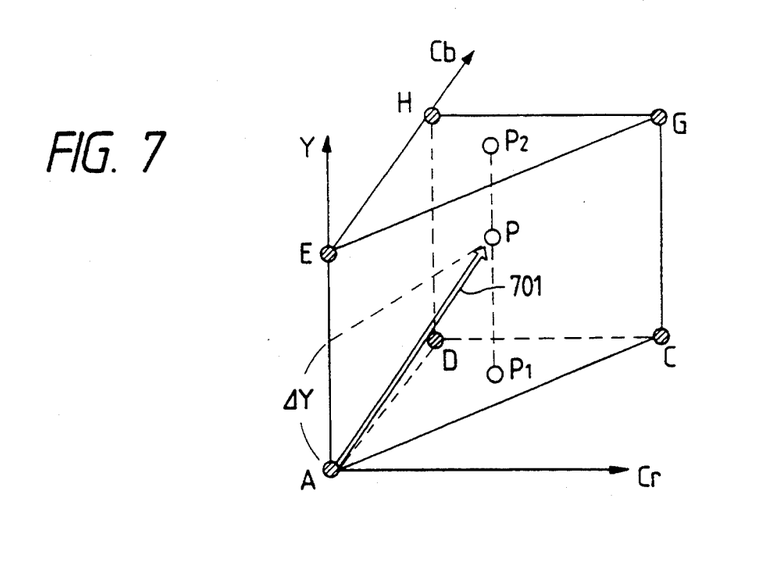
FIG. 7 is a view showing the other prism ACD-EGH in the color conversion apparatus.
Figure 8:
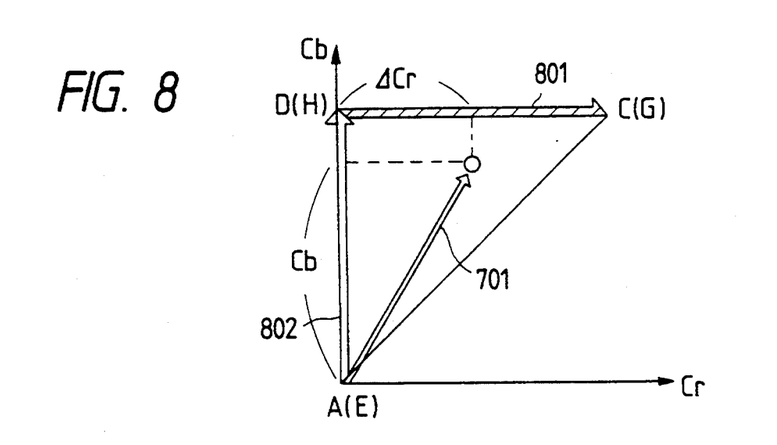
FIG. 8 is a view showing the prism ACD-EGH when seen from the direction of Y-axis.

On the other hand, if the input color point is located in the other prism ACD-EGH which is formed together with the prism ABC-EFG by dividing the rectangular parallelopiped ABCD-EFGH into two, the interpolation operation is carried out as shown in FIGS. 7 and 8.

That is, as well as the previous case, a line is drawn from the point P in parallel with Y-axis to obtain intersection points P1, P2 on a triangle ACD and a triangle EGH, respectively. Then, components $\Delta Y$, $\Delta Cr$, and $\Delta Cb$ of the vector AP in respective axis directions Y, Cr, and Cb are obtained.

Thus, in the first step, an output value of the point P1 is obtained as follows:

[Numerical Formula 6]     Equation (6)

$(P1) = (A) + \Delta Cr \cdot \{(C) - (D)\} +$ $\Delta Cb \cdot \{(D) - (A)\}$

In the second step, an output value of the point P2 is obtained as follows:

[Numerical Formula 7]     Equation (7)

$(P2) = (E) + \Delta Cr \cdot \{(G) - (H)\} +$ $\Delta Cb \cdot \{(H) - (E)\}$

In the third step, an interpolated output value of the point P is obtained as follows:

[Numerical Formula 8]

$(P) = (P1) + \Delta Y \cdot \{(P2) - (P1)\}$     Equation (8)

If the terms of previously obtained equations (6) and (7) are entered in the above equation (8), its result becomes as follows:

[Numerical Formula 9]     Equation (9)

$(P) = (A) + \Delta Cr \cdot \{(C) - (D)\} + \Delta Cb \cdot \{(D) - (A)\} +$ $\Delta Y \cdot [(E) - (A) + \Delta Cr \cdot$ -continued
$$\{(G) - (H) - (C) + (D)\} +$$
$$\Delta Cb \cdot \{(H) - (E) - (D) + (A)\}]$$

Furthermore, the judgement of which of the prism ABC-EFG and the prism ACD-EGH the input color point P is involved in is carried out based on a result of a judgement of which is larger between the component $\Delta Cr$ and the component $\Delta Cb$ of the vector AP. Its result is obtained as follows.

In case of $\Delta Cr \geq \Delta Cb$; the prism ABC-EFG

In case of $\Delta Cr < \Delta Cb$; the prism ACD-EGH    Equation (10)

As is explained, in accordance with the color conversion method of the present embodiment, an input signal defined by three principal colors RGB is transformed into a three-dimensional space Y, Cr, and Cb. In obtaining an output value from this input space defined by Y, Cr, and Cb, first of all this input space is dissected into a plurality of rectangular parallelopipeds and, in turn, each rectangular parallelopiped is further divided into two triangular poles, so that the interpolation calculation can be carried out by using output values at respective vertices in the prism and their mutual difference values.

2. Color Conversion Apparatus

Next, one specific embodiment showing a color conversion 15 apparatus of the present invention is explained with reference to FIGS. 1 and 2.

Figure 1:
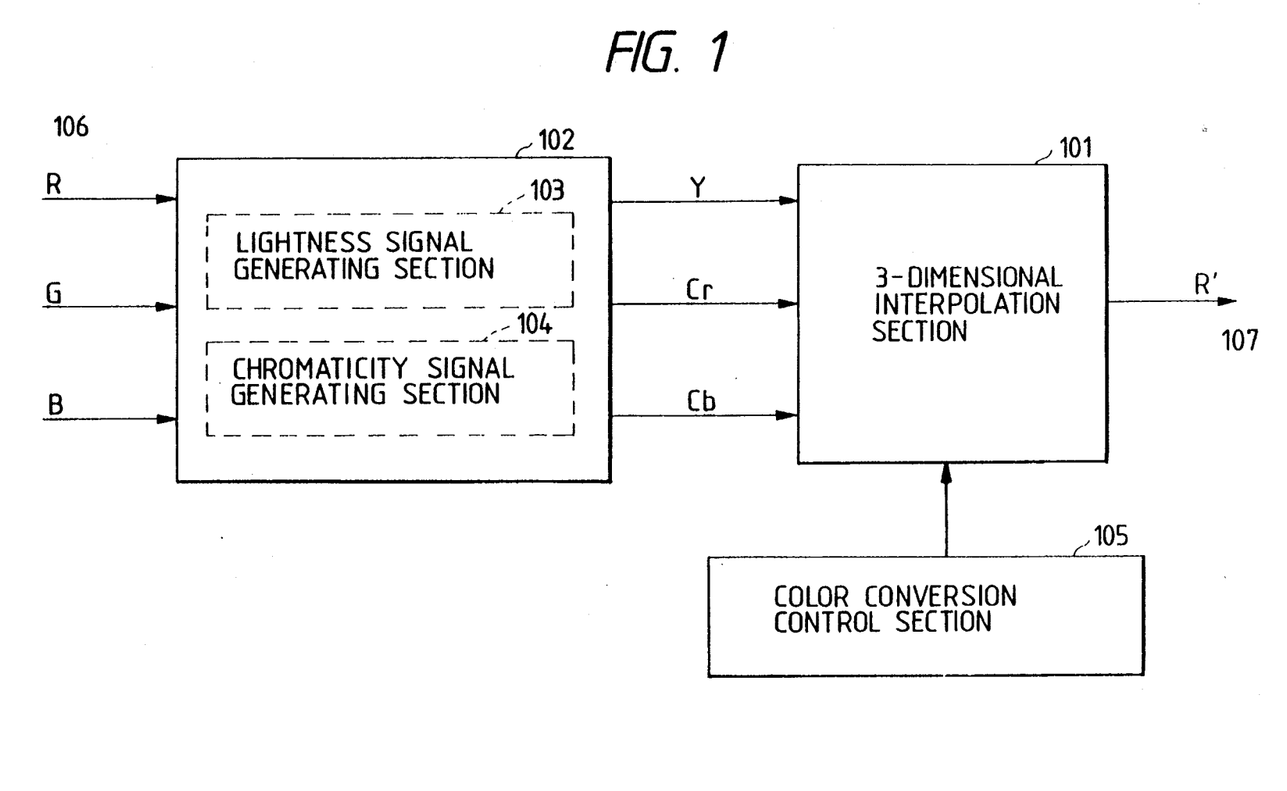
FIG. 1 is a schematic block diagram showing a color conversion apparatus in accordance with one embodiment of the present invention.

FIG. 1 is schematic block diagram of a color conversion apparatus in accordance with one embodiment of the present invention. FIG. 1 simplifies the circuit by illustrating only one circuit portion for obtaining an output signal R' from the input signal (R, G, B). Therefore, in fact, to generate an output signal (R', G', B') from the input signal (R, G, B), three pieces of three-dimensional interpolation portion 101 (one of which is shown in FIG. 1) are required.

The input signals R, G, and B are transformed into Y, Cr, and Cb signals in a lightness & chromaticity generating section 102. The lightness & chromaticity generating section 102 consists of a lightness signal generating section 103 and a chromaticity signal generating section 104. The lightness signal generating section 103 produces the signal Y, and the chromaticity signal generating section 104 produces the signals Cr, Cb by subtracting the signal Y from the signals R and B, respectively.

Furthermore, there is provided a color conversion control section 105 which has a function to send data to color conversion tables provided in the three-dimensional interpolation section 101 so as to execute any color conversion.

In a practical usage, the signal G can be used instead of the signal Y since the signal G has the largest contribution factor to the signal Y among three principal colors RGB. In such a case, the three signals G, R, and B are directly inputted into the three-dimensional interpolation section 101 without being transformed into lightness-chromaticity signal, instead of the signals Y, Cr, and Cb.

Figure 2:
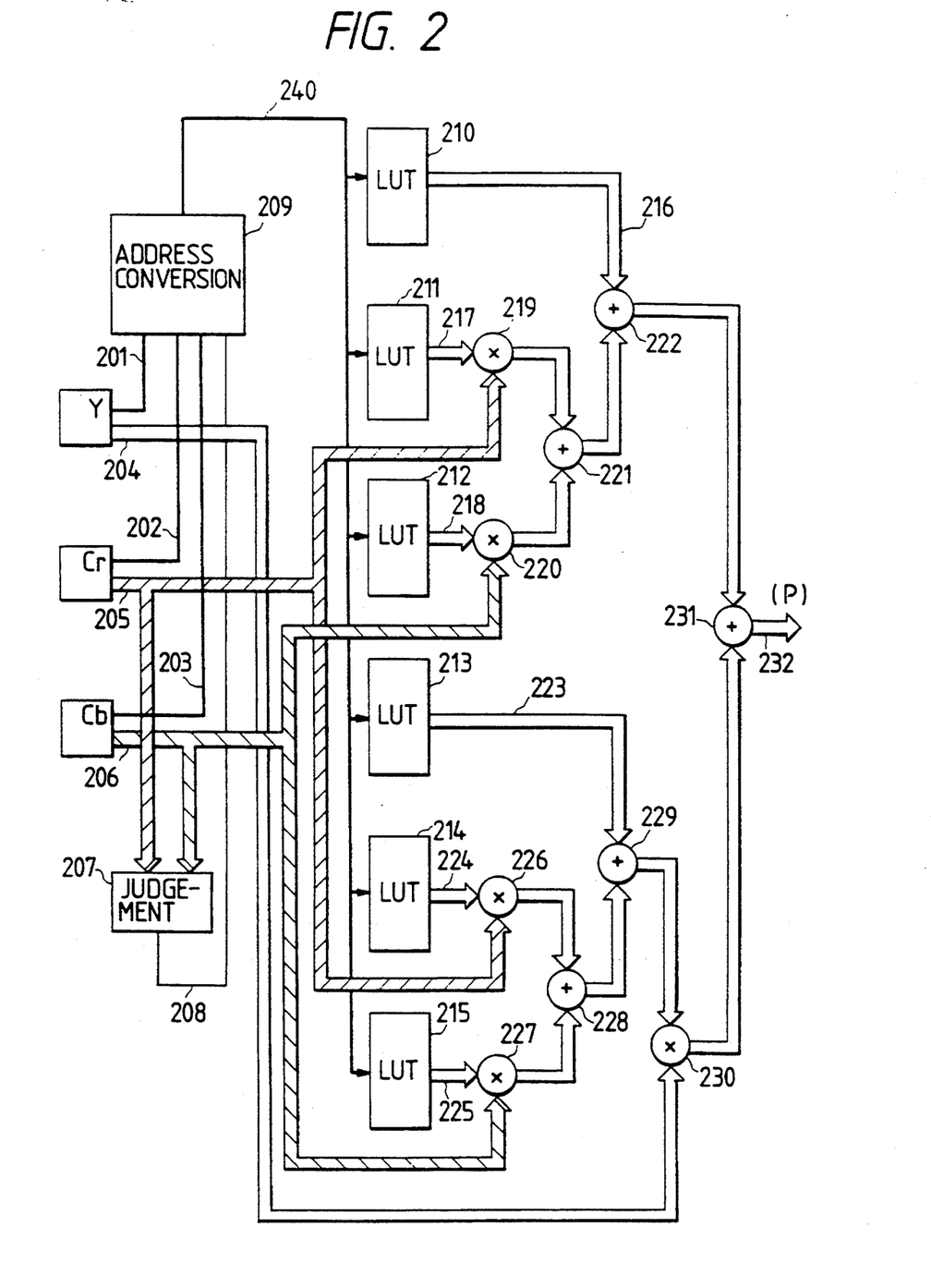
FIG. 2 is a block diagram showing a three-dimensional interpolation section which constitutes an essential portion of the color conversion apparatus of FIG. 1.

FIG. 2 is a view illustrating a detail constitution of the three-dimensional interpolation section 101. In the three-dimensional interpolation section 101, though the input space of Y, Cr, and Cb is dissected into a plurality of rectangular parallelopipeds and further divided into prisms, this dissection into the rectangular parallelopipeds is carried out by dividing digital signals representing the Y, Cr, and Cb signals of FIG. 2 into upper-bit signal and lower-bit signals.

As an example, if supposed that the Y, Cr, and Cb signals are 8-bit signals, their upper-bit signals are determined by choosing 3, 3, and 3 bits from their uppermost digits and their lower-bit signals are determined by taking remaining lower 5, 5, and 5 bits.

In this case, the three-dimensional space of Y, Cr, and Cb is dissected $2^3 = 8$ pieces of interpolation segments in the Y-axis direction, is dissected $2^3 = 8$ pieces of interpolation segments in the Cr-axis direction, and is dissected $2^3 = 8$ pieces of interpolation segments in the Cb-axis direction. That is, this three-dimensional space of Y, Cr, and Cb is dissected, as a whole, into $(8) \times (8) \times (8) = 512$ pieces of rectangular parallelopipeds, and lengths of respective edges of each rectangular parallelopiped become 32, 32, and 32 in the directions of Y, Cr, and Cb, respectively.

The upper-bit signals of the signals Y, Cr, and Cb are shown as 201, 202, and 203 in FIG. 2. And, the lower-bit signals of the signals Y, Cr, and Cb are shown as 204, 205, and 206. Namely in FIGS. 3 and 4, the upper-bit signals express the position coordinates of the point A which is the closest point to an origin by using numerical values among 0 to 7, 0 to 7, and 0 to 7 defined in directions of respective axes of Y, Cr, and Cb. On the contrary, the lower-bit signals express the position coordinates of the input color point elongated from a standard point of the point A by using numerical values among 0 to 31, 0 to 31, and 0 to 31 defined in directions of respective axes of Y, Cr, and Cb. Accordingly, it will be understood that the lower-bit signals express above-described $\Delta Y$, $\Delta Cr$, and $\Delta Cb$.

These lower-bit signals; i.e. $\Delta Cr$ signal 205 and $\Delta Cb$ signal 206, are inputted into a prism judging section 207. And, the prism judging section 207 outputs 1-bit prism judging signal 208. This prism judging section 207 is provided to make a judgement of which of two prisms, being formed by dividing the rectangular parallelopiped into two, the input color point is involved in, in accordance with the equation (10). The 1-bit prism judging signal 208 is expressed by using "1" or "0" on the basis of the judgement of which is larger between the $\Delta Cr$ signal 205 and the $\Delta Cb$ signal 206 in the prism judging section 207.

It is now supposed that the input color signal is found to be included in the prism ABC-EFG as a result of the above judgement.

The signal $\Delta Cr$ is supplied to the multipliers 219, 226 and the signal $\Delta Cb$ is supplied to the multipliers 220, 227. Above upper-bit signal sets 201, 202, and 203 and the prism judging signal 208 are assembled as a triangle-pole region address signal of a 10 (=3+3+3+1)-bit.

This triangle-pole region address signal is inputted into the address conversion means 209 to generate a one-dimensional address signal 240 utilized for accessing the color conversion table memories 210~215. This is effective to solve a problem such that, if the prism region address signal consisting of three sets of numerical values is directly used for accessing the color conversion table memories, addresses of non-existing colors are generated and therefore the color conversion memories cannot be used effectively.

Figure 9:
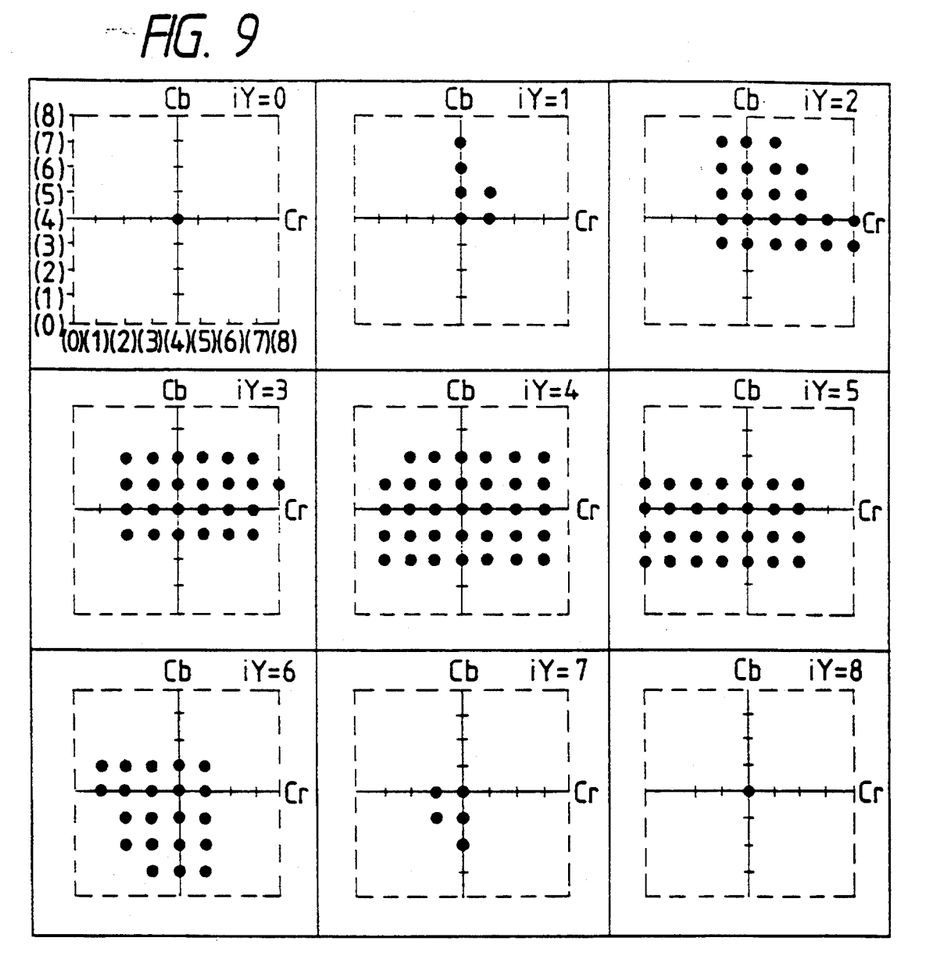
FIG. 9 is a view showing lattice points of an RGB space actually existing in a YCrCb space of the color conversion apparatus in accordance with one embodiment of the present invention.

For example, in accordance with above example, the RGB space is converted into the YCrCb space and thereafter dissected into total 1024 pieces of prisms and 729 pieces lattice points are disposed in the YCrCb space. However, the lattice points which were involved in the original RGB space is merely 145 pieces. In other words, it is concluded that remaining lattice points are points which cannot be inputted as colors. FIG. 9 explains this point more detail.

FIG. 9 shows 9 pieces of plane having rectangular Cr-Cb coordinates, defined by 9 pieces of constant Y-values; i.e. iY=0, iY=1, ... iY=8. The lattice points existing in the RGB space are marked by dots. Prism regions formed by these lattice points are approximately 184 pieces.

Accordingly, if these prism regions are numbered in accordance with a predetermined order, address required for color conversion table memories can be decreased from original 10 bits (1024 pieces prisms) to 8 bits (184 pieces prisms). By doing this, it becomes possible to decrease a necessary memory capacity or, in other words, effectively use the memory.

This address signal is referred to as the one-dimensional address signal 240. This one-dimensional address signal 240 is inputted into respective color table memories 210 to 215. These color conversion table memories 210 to 215 store, in advance, the information which are required for interpolation in the case where one prism is designated. They output the memorized data in parallel upon receipt of the one-dimensional address input.

When the prism ABC-EFG is designated as described above, the color conversion table memories 210, 211, and 212 output the output value (A), the first output difference value {(B)-(A)}, and the second output difference value {(C)-(A)} in the equation (5), respectively. These data are shown as signals 216, 217, and 218 in FIG. 2. In accordance with equation (5), the data 217 and 205 are multiplied in a multiplier 219, and the data 218 and 206 are multiplied in a multiplier 220.

These two multiplication results are added in an adder 221. And, this adding result is further added with the data 216 in an adder 222. Thus, an adding result of the first to the third terms of the equation (5) is obtained.

The color conversion table memories 213, 214, and 215 output the third output difference value {(E)-(A)}, the fourth output difference value {(F)-(E)-(B)+(A)}, and the fifth output difference value {(G)-(F)-(C)+(B)} of equation (5), respectively. These data are expressed as 223, 224, and 225 in FIG. 2.

In accordance with the fourth term bracketed by [ ] in the equation (5), the data 224 and 205 are multiplied in a multiplier 226, and the data 225 and 206 are multiplied in a multiplier 227. These two multiplication results are added in an adder 228. And, this adding result is added with the data 223 in an adder 229.

This result is multiplied with the lower-bit signal $\Delta Y$ of the signal Y shown by 204 in a multiplier 230. Thus, the calculation of the fourth term of the equation (5) is completed. The result obtained in this manner is further added with the previously obtained result of the first to the third terms in an adder 231, so as to output a final result (P) of the equation (5) as a data 232.

When the judgement of the prism judging section 207 shows that the input color signal is involved in the prism ACD-EGH, the color conversion table memories are accessed in a condition that only the one-dimensional address signal 240 is different from the above-described case. In such a case, output values of respective table memories 210~215 become to correspond to respective terms of equation (9), so as to operate to calculate the equation (9) in order to execute an interpolation.

By the way, in this embodiment, it should be noted that bit number of each signal and a ratio distributing the upper-bit signal and the lower-bit signal are temporarily determined for merely showing one example. Therefore, it is needless to say that these values can be substituted by other numerical values.

2.1 Lightness Signal Generating Section

Figure 10:
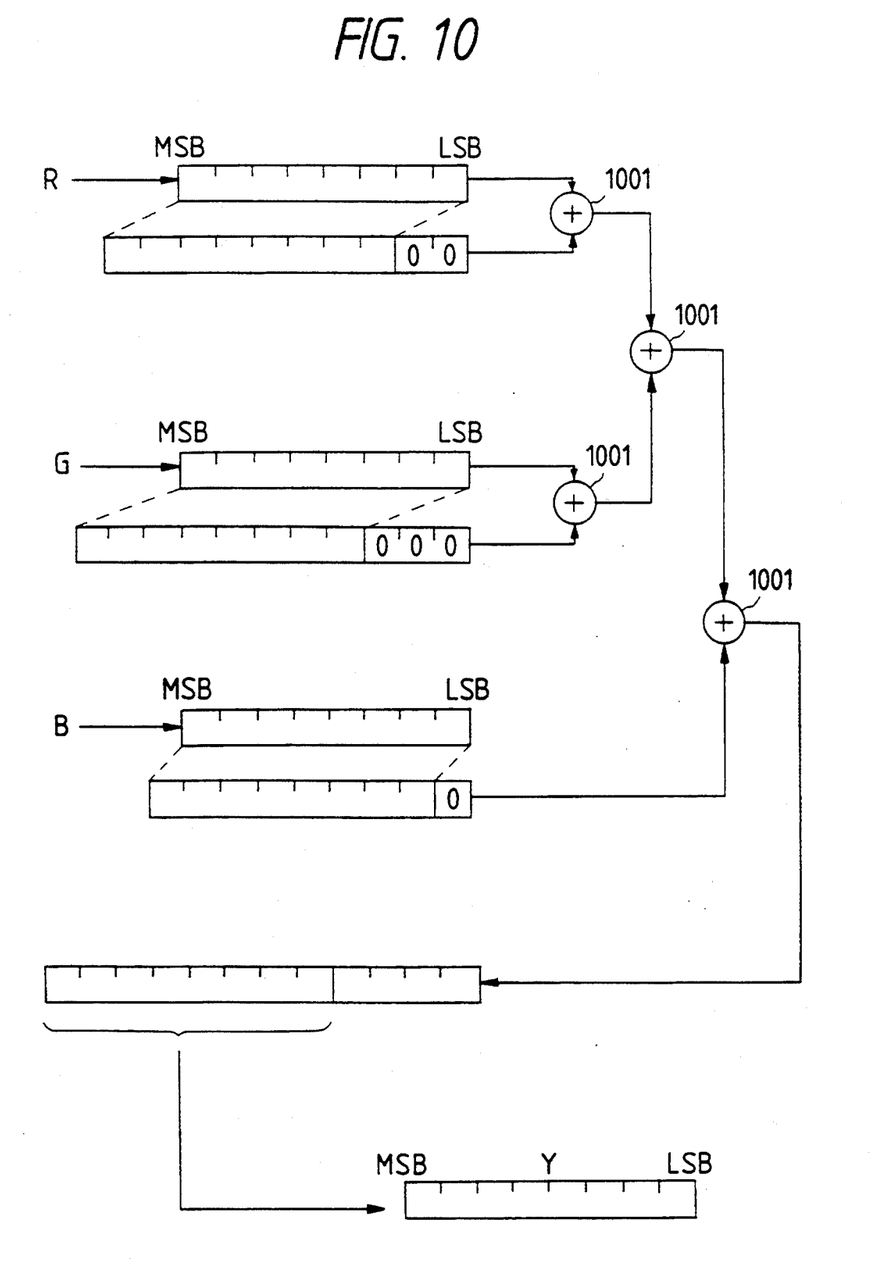
FIG. 10 is a block diagram showing one embodiment of a lightness signal generating section which constitutes an essential portion of the color conversion apparatus.

Next, with reference to FIG. 10, one embodiment of a lightness signal generating section which serves as an essential part of the color conversion apparatus of FIG. 1.

Conventionally, a matrix calculator comprising multipliers and adders has been utilized for carrying out the calculation indicated by the [Numerical Formula 1]. However, according to this conventional method, three multipliers and two adders are required for only generating lightness signal. Such a complicated device is therefore not suitable for the luminous signal generating section of the present invention. Accordingly, coefficients required for generating lightness signal are approximately expressed by using several powers of 2. In general, its detail can be specified as follows:

$$0.299 - (1/4) + (1/16) = 0.3125 \quad \text{Equation (11)}$$
$$0.587 - (1/2) + (1/16) = 0.5625$$
$$0.114 - (1/8) = 0.125$$

wherein, $$0.3125 + 0.5625 + 0.125 = 1.000 \quad \text{Equation (12)}$$

In this case, though three coefficients are approximated, no problem would be derived. Rather the fact that the summation of respective coefficients equal to 1 is desirable, because it can satisfy a condition for a normal form.

In an actual apparatus, in order to minimize errors, numerical values are multiplied by power of 2 and thereafter divided by 16. That is, the following equation is carried out.

$$Y = (4 \cdot R + R + 8 \cdot G + G + 2 \cdot B)/16 \quad \text{Equation (13)}$$

The power of 2 in the brackets () are all executed by a eft bit shift calculation and, on the other hand, the division by 16 is carried out in a right bit shift calculation. Therefore, no multiplication or no division is required.

That is, respective numerical values are taken out from respective bits of digital value of R, G, and B and added with each other in an adder 1001. After that, the Y signal is obtained by shifting its output by an amount of 4 bits. According to this calculation, the Y signal can take any integer between 0 to 255. Table 1 shows differences between accurately calculated Y-value and approximately calculated Y-value.

TABLE 1

| COLOR POINT | (R, G, B) | Y | approxi. Y |
|---|---|---|---|
| RED | (255, 0, 0) | 76 | 79 |
| YELLOW | (255, 255, 0) | 225 | 223 |
| GREEN | (0, 255, 0) | 149 | 143 |
| CYAN | (0, 255, 255) | 178 | 175 |
| BLUE | (0, 0, 255) | 29 | 31 |
| MAGENTA | (255, 0, 255) | 105 | 111 |

TABLE 1-continued

| COLOR POINT | (R, G, B) | Y | approxi. Y |
|---|---|---|---|
| BLACK | (0, 0, 0) | 0 | 0 |
| WHITE | (255, 255, 255) | 254 | 255 |

2.2 Chromaticity Signal Generating Section

Figure 11:
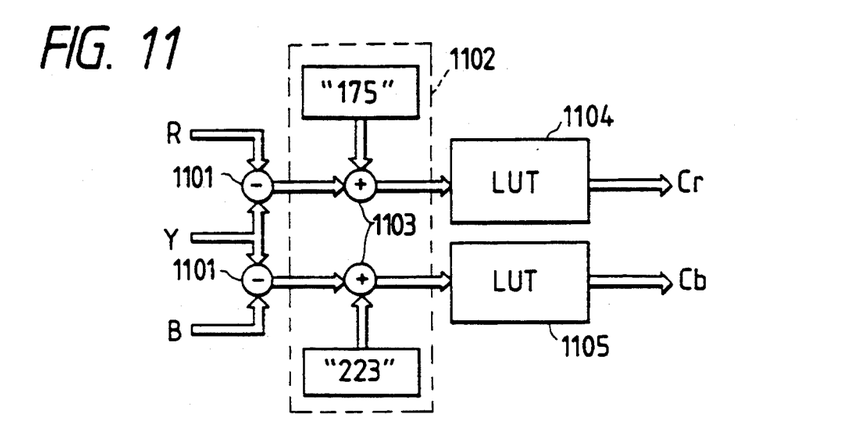
FIG. 11 is a block diagram showing one embodiment of a chromaticity signal generating section which constitutes an essential portion of the color conversion apparatus.

Next, with reference to FIG. 11, a chromaticity signal generating section which serves as an essential part of the color conversion apparatus of FIG. 1.

Chromaticities Cr and Cb take not only positive value but negative value. Though there are various methods for expressing negative numbers, it is supposed hereinafter that these chromaticities are expressed by 8-bit positive integers in order to use as the chromaticity signal generating section of the color conversion apparatus in accordance with the present invention. Accordingly, in transforming respective 8-bit positive integers of RGB into 8-bit positive integers of YCrCb, value ranges of $Cr = R - Y$, $Cb = B - Y$ are calculated.

Hereupon, if the lightness signal generating section of the present invention is utilized here, the Y-signal is defined as follows:

$$0 \leq Y \leq 255 \qquad \text{Equation (14)}$$

In this case:

$$-175 \leq (R - Y) \leq 176 \qquad \text{Equation (15)}$$

$$-223 \leq (B - Y) \leq 224 \qquad \text{Equation (16)}$$

Then, if the chromaticity signals obtained after assigning these values from 0 to 255 in order to express them in normal forms are referred to Cr, Cb, these Cr and Cb are calculated as follows:

$$Cr = (128/175) \cdot (Cr + 175) \qquad \text{Equation (17)}$$
$$Cb = (128/223) \cdot (Cb + 223) \qquad \text{Equation (18)}$$

In FIG. 11, the signal Cr is obtained by subtracting the signal Y from the signal R in a subtracter 1101 and, in turn, added with a numerical value "175" in an adder 1103 provided in a negative-value level shift section 1102, and further multiplied by (128/175=0,731) in a look-up table 1104. In the same way, the signal Cb is obtained by subtracting the signal Y from the signal B in another subtracter 1101 and, in turn, added with a numerical value "223" in another adder 1103 provided in the negative-value level shift section 1102, and further multiplied by (128/223=0,574) in a look-up table 1105.

Figure 12A:
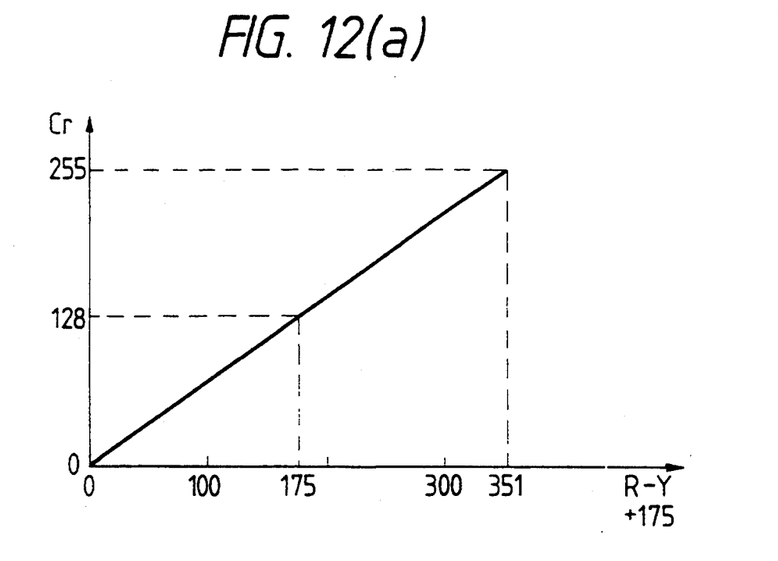
Figure 12B:
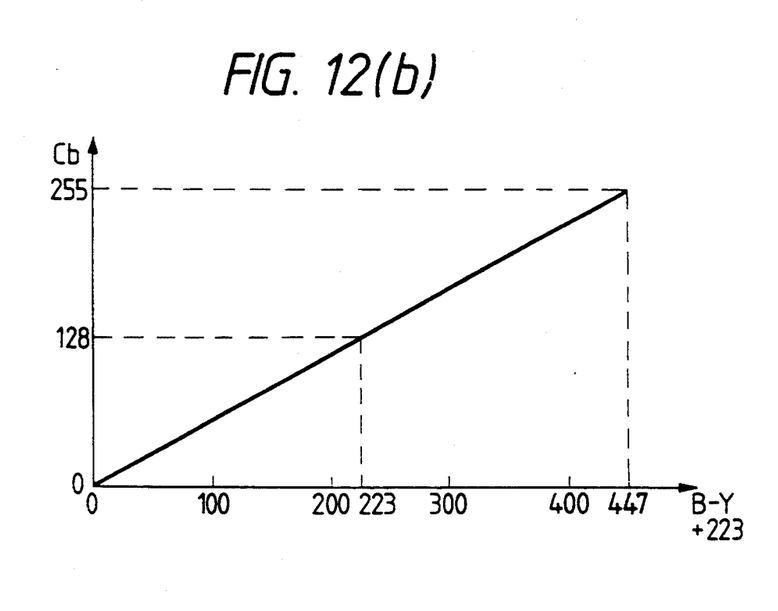

FIG. 12 shows details of the look-up tables 1104 and 1105. The look-up table 1104 for Cr is constituted by 352 pieces of one-dimensional memory, and the look-up table 1105 for Cb is constituted by 448 pieces of one-dimensional memory. These look-up tables memorize data which are obtained as a result when respective input values are multiplied by a predetermined coefficient.

By use of the level shift section and the look-up table, the chromaticity Cr and Cb can be transformed in 8-bit form in which an original 0 is transformed into 128.

By the way, a chromaticity range for 8-bit transformation can be more narrowed. In such a case, all that is necessary to be done is merely rewriting data in these look-up tables. This modification results in a quantization to 256-step gradation, becoming effective in improving interpolation accuracy in the chromaticity direction. It should be noted that the level shift section is not requisite for this invention. For example, it would be possible to eliminate the level shift section by allowing negative numbers to be inputted into the look-up table.

3. Comparison Between Present Invention and Conventional Art

Next, the following explanation is a difference of an interpolated line by the conventional tetrahedron-type interpolation and an interpolated line by the novel prism interpolation which uses a prism having a base plane parallel to the chromaticity plane as explained in the present invention.

Figure 13:
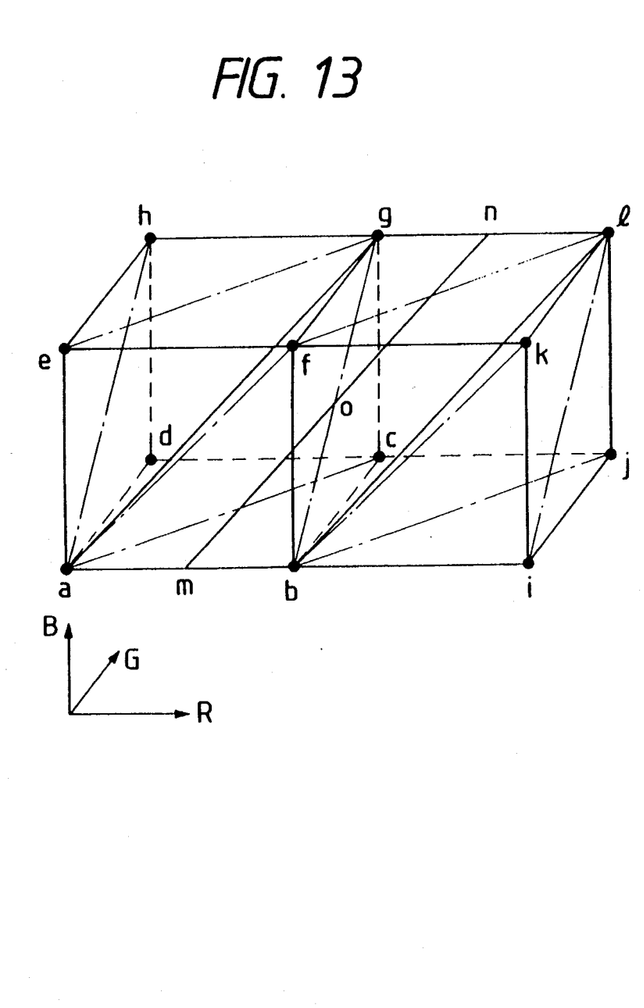
FIG. 13 is a conceptual view showing input color loci in a conventional input color space.

FIG. 13 shows an input space expressed by R, G, and B which is dissected into cubes each being dissected into 6 tetrahedrons. In a first cube abcd-efgh and a second cube bijc-fklg, there are drawn three line segments as loci of input color changing their gradation in a lightness direction. Since the lightness direction coincides to a diagonal direction of the cube, line segments a-g, b-l, and m-n are chosen as these three loci. Hereupon, the reference symbol m denotes a midway point of the line segment a-b, and the reference symbol n denotes a midway point of the line segment g-l.

Figure 14:
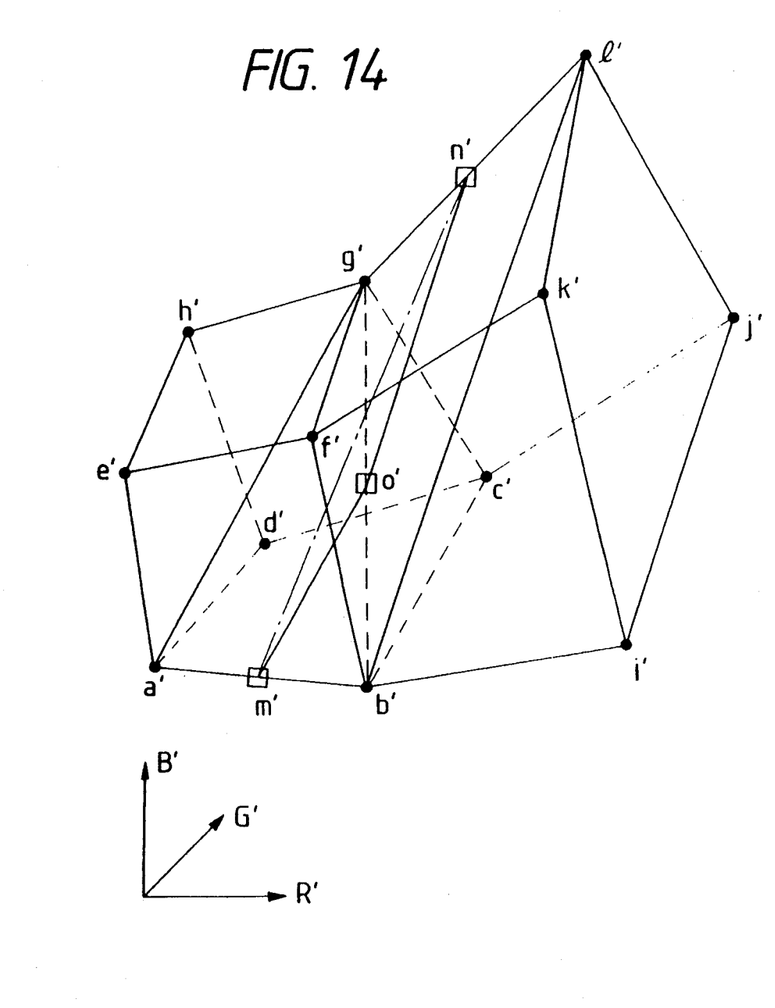
FIG. 14 is a conceptual view showing interpolated output line segments in a conventional output space.

FIG. 14 shows a distorted hexahedron which represents the interpolated result of the input cube of FIG. 13 in an output space (R', G', B'). A hexahedron a'b'c'd'-e'f'g'h' corresponds to the first cube in the input space, and a hexahedron b'i'j'c'-f'k'l'g' corresponds to the second cube in the input space. Output interpolation line segments; i.e. diagonal line segments a'-g' and b'-l', correspond to the loci a-g, b-l of the input space.

However, in this case, an output interpolation line m'-n' corresponding to the line segment m-n of the input space becomes a broken line m'-o'-n' and is not positioned at a midway between the line segments a'-g', and b'-l'.

This is because the line segment m-n is different from other two line segments a-g, b-l in that the line segment m-n does not coincide with a diagonal line of cube while each of the line segments a-g, b-l coincides with a diagonal line of its belonging cube. That is, since the cube is dissected into 6 tetrahedrons commonly involving the diagonal line of the cube, it is regarded that the line segments a-g, b-l are perfectly involved in any one of tetrahedrons. On the other hand, the line segment m-n is involved in two different tetrahedrons; i.e. a tetrahedron abfg of the first cube and a tetrahedron bfgl of the second cube.

In the case where a certain line segment passes two different tetrahedrons like the segment m-n, the interpolation operation is carried out independent of one another in respective tetrahedrons. In such a case, the interpolation line is unnaturally bent at the boundary of these two tetrahedrons, though its continuity is kept at the boundary.

As is explained above, in case of the tetrahedron-type interpolation, when the input color is moved with keeping its direction in parallel with the lightness direction, its interpolated output does not meet a line segment m'-n' to be expected as a correct output in the output space because of its non-linearity in color conversion. This affects a gradation of output image of color.

Figure 15:
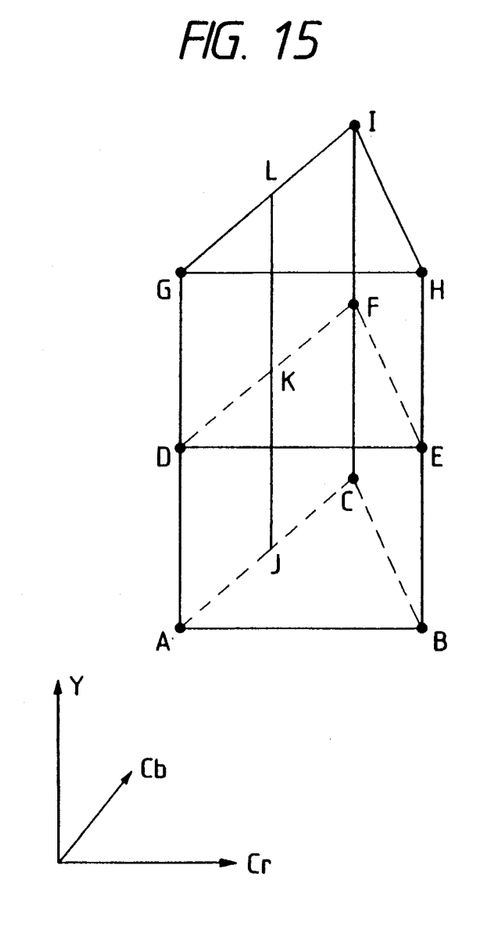
FIG. 15 is a conceptual view showing input color loci in an input space in compliance with the color conversion method n accordance with the present invention; and, FIG. 16 is a conceptual view showing interpolated output line segments in an output space in compliance with the color conversion method of the present invention.

On the other hand, FIG. 15 shows the interpolation method using the prism in accordance with this embodiment. In a space defined by Y, Cr, and Cb, there are formed two prism regions ABC-DEF and DEF-GHI.

In this case, if supposed that line segments ADG, CFI, and JKL are set as input color loci which extend parallel to the lightness direction Y. Hereupon, the line segment JKL is located at a midway between the line segments ADG and CFI.

Figure 16:
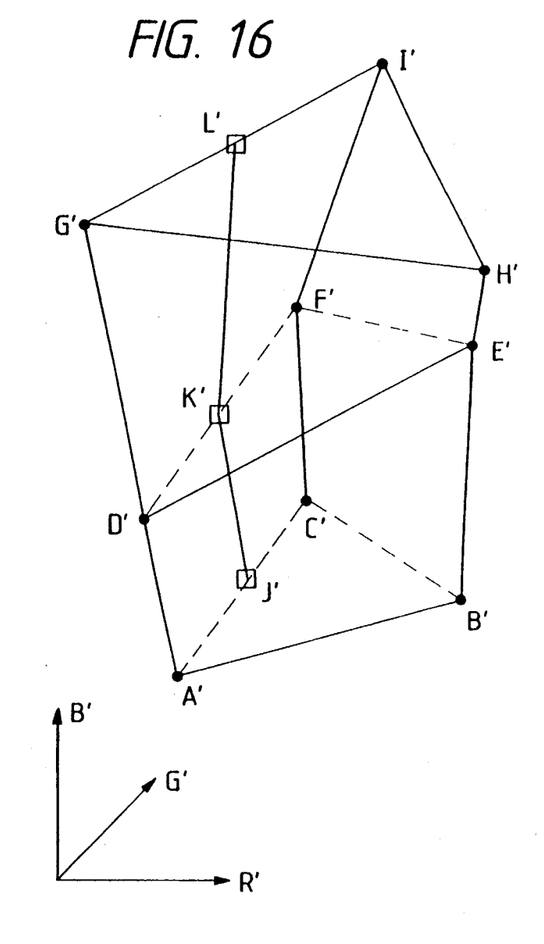

FIG. 16 shows interpolated prisms A'B'C'-D'E'F' and D'E'F'-G'H'I' which are formed in an output space (R', G', B') as a result of the interpolation of the above two prisms ABC-DEF and DEF-GHI in the input space. These prisms A'B'C'-D'E'F' and D'E'F'-G'H'I' are distorted due to affection of non-linear conversion.

Three line segments of input color corresponds to broken lines A'D'G', C'F'I', and J'K'L' in this output space. These three lines pass together from one prism to an adjacent prism. And, it never happens that any one of these three lines passes a different prism independent of others. Therefore, the interpolated broken lines are not unnatural. For example, it will be understood that the broken line J'K'L', which were located at the midway between the lines ADG and CFI in the input space, is still correctly located at a midway between the broken lines A'D'G' and C'F'I' even after having been interpolated.

As described above, the present embodiment can accurately execute a linear interpolation with respect to the color locus along the lightness direction compared with the conventional method.

As is explained in the foregoing description, in accordance with the color conversion apparatus of the present invention, a real-time color conversion using three-dimensional inputs and outputs can be processed by use of a novel interpolation method capable of keeping continuity.

Furthermore, as described previously as technical background, the conventional three-dimensional color signal interpolation method which uses dissected tetrahedrons did not give specific meanings to respective coordinate axes defining the three-dimensional space, resulting in non-efficiency in utilizing memories. However, in accordance with the present invention, by utilizing a triangle-pole shaped interpolation unit-space, a main axis direction of the prism can be characterized for representing lightness and a triangle base plane can be characterized for representing chromaticity. Accordingly, it becomes possible to separate a memory into two for lightness and chromaticity so as to effectively utilize it. Moreover, when a color causes a change in the lightness direction being a sensitive direction in view of human visual characteristics, it can be surely prevented the unnatural bent from causing on the interpolated line at the boundary between adjacent two unit interpolation regions, though it was recognized in the conventional tetrahedron interpolation.

Still further, since the input space is defined by lightness and chromaticity components in executing the interpolation, the color conversion method of the present invention is convenient in applying it to a field of color adjustment. Thus, it can bring a remarkable effect in a field of color image processing.

Yet further, the present invention is advantageous in that color conversion table memories can be effectively utilized by use of an address conversion means.

Still further, a lightness signal generating apparatus and a chromaticity signal generating apparatus adopted in the present invention not only effect their merits by virtue of their simplified structures when associated to function as a part of the color conversion apparatus in accordance with the present invention but provides a novel unit simpler than a conventional matrix calculator when used as an independent lightness signal generating unit or a chromaticity signal generating unit. Especially, adoption of look-up tables can enlarge the degree of freedom in generating chromaticity signal.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within metes and bounds of the claims, or equivalence of such metes and bounds are therefore intended to embraced by the claims.

What is claimed is:

1. A color conversion method comprising steps of:

storing values representing a relationship between input and output color signals and difference values representing a relationship between said output color signals in color conversion table memories, so as to obtain an output color signal on the basis of an input color signal with reference to the values stored in the color conversion table memories;

dissecting an input color space into a plurality of rectangular parallelopipeds, further dividing at least one of the rectangular parallelepipeds along its diagonal line passing a vertex closest to an origin of the input color space so as to form two prism regions;

judging as to which of said two prism regions involves the input color signal involves the input color signal; and interpolating the output color signal to be obtained based on the input color signal by use of the stored values in the color conversion table memories corresponding to the prism region obtained in the above judgement.

2. A color conversion method in accordance with claim 1 further comprising steps of:

converting the input color signal into a lightness-chromaticity separated signal and memorizing the lightness-chromaticity separated signal into the color conversion table memory;

dissecting each axis of a three-dimensional space constituted by a lightness axis and a chromaticity plane so as to obtain a plurality of rectangular parallelopipeds;

further dividing each of said rectangular parallelopipeds along its diagonal line passing a vertex closes to an origin of the input space so as to form two prisms, said prism having bases positioned on a plane which is parallel with the chromaticity plane;

judging as to which of said prisms involves the input color signal;

drawing a line in parallel with the lightness axis from a distal end of a vector representing said input color signal toward two triangular base planes in each prism, so as to obtain two intersection points of said line with respect to said two triangular base planes;

obtaining output values at these two intersection points on the two triangular base planes by suing a linear interpolation on the basis of output values of respective vertices of the triangular base planes; and obtaining the output color signal by further interpolating thus obtained output values in a direction of the lightness axis.

3. A color conversion apparatus comprising:
a prism judging section which dissects a three-dimensional space constituted based on an input color signal into a plurality of rectangular parallelopipeds, further divides at least one of the rectangular parallelopipeds along its diagonal line passing a vertex closest to an origin of the input color space so as to form two prism regions, and judges as to which of prisms involves the input color signal;
color conversion table memories storing an output value (A) representing one vertex position of the prism, first output difference values $\{(B)-(A)\}$ and $\{(F)-(E)\}$, second output difference value $\{(C)-(B)\}$ and $\{(G)-(F)\}$, and a third output difference value $\{(E)-(A)\}$ which represent difference values between respective output values of respective vertices of the prism, and a fourth output difference value $\{(F)-(E)\}-(B)+(A)\}$ and a fifth output difference value $\{(G)-(F)\}-(C)+(B)\}$ which represent mutual differences of said first and second difference values;
multipliers and adders for executing an interpolation calculation on the basis of said values stored in said color conversion table memories.

4. A color conversion apparatus in accordance with claim 3 further comprising a lightness signal generating section for producing a lightness signal from the input color signal and a chromaticity signal generating section for producing a chromaticity signal from the input color signal.

5. A color conversion apparatus which includes a three-dimensional interpolation section for executing an interpolation operation, said three-dimensional interpolation section comprising;
a prism judging section which dissects a three-dimensional space being formed by an input color signal into a plurality of rectangular parallelopipeds, further divides at least one of the rectangular parallelopipeds along its diagonal line passing a vertex closes to an origin of the input color space so as to form two prisms, and judges which of the prisms involves the input color signal;
color conversion table memories storing output values corresponding to respective vertices of the prism region;
address conversion means for executing a transformation to one-dimensional address signal on the basis of either an upper-bit signal or a lower-bit signal of said input color signal and a judgement signal from the prism judging section; and
multipliers and adders;
whereby generating the output color signal by converting the input color signal in such a manner that the interpolation operation can be executed in each prism by use of output values from said color conversion table memories and the other of said upper-bit signal and the lower-bit signal.

6. A color conversion apparatus in accordance with claim 5 in which said address conversion means numbers the prism regions partitioned by lattice points of a three-dimensional color space in accordance with a predetermined order, and, in response to an input of three sets of numerical values representing one prism region in the three-dimensional color space, outputs the one-dimensional address signal representing a numerical value designating said one prism region which is defined by above numbering operation.

7. A color conversion apparatus in accordance with claim 5 further comprising a lightness signal generating means which expresses coefficients utilized for generating a lightness signal from three primary color signals of red, green, and blue in a form of a summation of several powers of 2, and generates the lightness signal by a bit shift and an adding means.

8. A color conversion apparatus in accordance with claim 5, further comprising, in order to generate chromaticity signals from three principal signals of red, green, and blue, a subtracting means for generating a difference signal between the red signal and a lightness signal, and a difference signal between the blue signal and the lightness signal, and chromaticity signal generating means for flexibly setting a range of chromaticity signal by use of a level shift means and a look-up table means.

9. A color conversion method comprising steps of:
dissecting an input color space into a plurality of rectangular parallelepipeds;
further dividing at least one of the rectangular parallelopipeds along its diagonal line passing a vertex closest to an origin of the input color space so as to form two prism regions; and
executing an interpolation on the basis of said prism region.

10. A color conversion method comprising steps of:
dissecting an input color space into a plurality of prism regions; and
executing an interpolation on the basis of said prism region,
wherein said step of dissecting comprises dissecting the input color space into a plurality of prism regions wherein each prism region comprises a polyhedron with only two congruent, parallel faces.

11. A color conversion method comprising steps of:
dissecting an input color space into a plurality of prism regions; and
executing an interpolation on the basis of said prism region,
wherein said step of dissecting comprises dissecting the input color space into a plurality of prism regions each comprising a polyhedron with only two congruent, parallel faces and all other faces parallelograms.

* * * * *